US012771454B2

(12) United States Patent
Tsai et al.

(10) Patent No.: US 12,771,454 B2
(45) Date of Patent: Oct. 20, 2026

(54) OPTICAL TRANSCEIVER EQUIPPED WITH FILTERING CAPACITORS HAVING NOISE ABSORBER

(71) Applicant: Prime World International Holdings Ltd., New Taipei City (TW)

(72) Inventors: Chao-Hung Tsai, New Taipei City (TW); Che-Shou Yeh, New Taipei City (TW); Ming-Chuan Wang, New Taipei City (TW)

(73) Assignee: Prime World International Holdings Ltd., New Taipei City (TW)

( * ) Notice: Subject to any disclaimer, the term of this patent is extended or adjusted under 35 U.S.C. 154(b) by 280 days.

(21) Appl. No.: 18/383,631

(22) Filed: Oct. 25, 2023

(65) Prior Publication Data

US 2025/0141554 A1 May 1, 2025

(51) Int. Cl.
*H04B 10/00* (2013.01)
*H04B 10/40* (2013.01)
*H04B 10/69* (2013.01)

(52) U.S. Cl.
CPC ......... *H04B 10/40* (2013.01); *H04B 10/6972* (2013.01)

(58) Field of Classification Search
CPC ............... H04B 10/40; H04B 10/6972; H04B 10/2507; H04B 10/616; H04B 10/69
See application file for complete search history.

(56) References Cited

U.S. PATENT DOCUMENTS

| | | | | |
|---|---|---|---|---|
| 5,742,480 A * | 4/1998 | Sawada | G02B 6/4281 | 174/254 |
| 10,197,755 B1 * | 2/2019 | Merl | H04B 10/40 | |
| 10,547,158 B1 * | 1/2020 | McColloch | H01S 5/0268 | |
| 2006/0018104 A1 * | 1/2006 | Katayama | H05K 1/0239 | 361/783 |
| 2006/0249820 A1 * | 11/2006 | Ice | G02B 6/428 | 257/666 |
| 2007/0237489 A1 * | 10/2007 | Sasser | G02B 6/4284 | 385/147 |
| 2010/0124423 A1 * | 5/2010 | Kagaya | H04B 10/40 | 333/202 |
| 2013/0019618 A1 * | 1/2013 | Veerasamy | B60S 1/087 | 62/85 |
| 2013/0108210 A1 * | 5/2013 | Uemura | G02B 6/43 | 385/14 |
| 2016/0109668 A1 * | 4/2016 | Pfnuer | G02B 6/4257 | 438/26 |

(Continued)

FOREIGN PATENT DOCUMENTS

CN 211062062 U * 7/2020

*Primary Examiner* — Agustin Bello
(74) *Attorney, Agent, or Firm* — Secant IP, P.L.L.C.

(57) ABSTRACT

An optical transceiver includes a printed circuit board, a transceiver module, a plurality of filtering capacitors and a noise absorber. The printed circuit board is provided with a plurality of signal lines and a plurality of gold fingers each connecting one of the plurality of signal lines. The transceiver module is disposed on the printed circuit board and connecting the plurality of signal lines. Each of the plurality of filtering capacitors is located on one of the plurality of signal lines. The noise absorber covers at least one surface of the plurality of filtering capacitors opposite to the printed circuit board.

9 Claims, 3 Drawing Sheets

(56) References Cited

U.S. PATENT DOCUMENTS

| | | | | |
|---|---|---|---|---|
| 2016/0149643 | A1* | 5/2016 | Kasai | H04J 14/0256<br>398/79 |
| 2017/0098634 | A1* | 4/2017 | Kumar | H01L 23/552 |
| 2018/0131330 | A1* | 5/2018 | Itabashi | H03F 3/54 |
| 2019/0162769 | A1* | 5/2019 | Zhao | H05K 7/1427 |
| 2019/0238236 | A1* | 8/2019 | Mii | G02B 6/4248 |
| 2019/0312652 | A1* | 10/2019 | Shiraishi | H04B 10/693 |
| 2020/0285008 | A1* | 9/2020 | Lin | G02B 6/4271 |
| 2021/0143787 | A1* | 5/2021 | Shirasaki | H01L 23/49894 |
| 2024/0337799 | A1* | 10/2024 | Ravichandran | G02B 6/4238 |
| 2025/0141554 | A1* | 5/2025 | Tsai | H04B 10/6972 |

* cited by examiner

OPTICAL TRANSCEIVER EQUIPPED WITH FILTERING CAPACITORS HAVING NOISE ABSORBER

BACKGROUND

1. Technical Field

This disclosure relates to an optical transceiver, more particularly to an optical transceiver equipped with filtering capacitors having noise absorber.

2. Related Art

Fiber optics are widely used for transmitting audio and data signals. As a transmission medium, optical technology offers numerous advantages over traditional electronic communication methods. For instance, optical signals allow for extremely high transmission rates and very high bandwidth capacity. Additionally, optics also provide more secure signaling since it does not allow partial signals to escape from the optical fiber cables, a situation that can occur in wired systems. Optical transmission can also cover longer distances without signal losses typically associated with copper wires carrying telecommunication signals.

With the increasing speeds of optical transmission offered by electronic modules, additional issues have arisen. For example, electronic devices and components operating at high frequencies often emit signals known as electromagnetic interference (EMI). This form of electrical noise is undesirable as EMI can disrupt the normal operation of other electronic components. Optical transceiver packaging, especially those operating at high transmission speeds, are particularly susceptible to the influence of EMI radiation.

SUMMARY

According to one or more embodiment of this disclosure, an optical transceiver includes a printed circuit board, a transceiver module, a plurality of filtering capacitors and a noise absorber. The printed circuit board is provided with a plurality of signal lines and a plurality of gold fingers each connecting one of the plurality of signal lines. The transceiver module is disposed on the printed circuit board and connects the plurality of signal lines. Each of the plurality of filtering capacitors is located on one of the plurality of signal lines. The noise absorber covers at least one surface of the plurality of filtering capacitors opposite to the printed circuit board.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
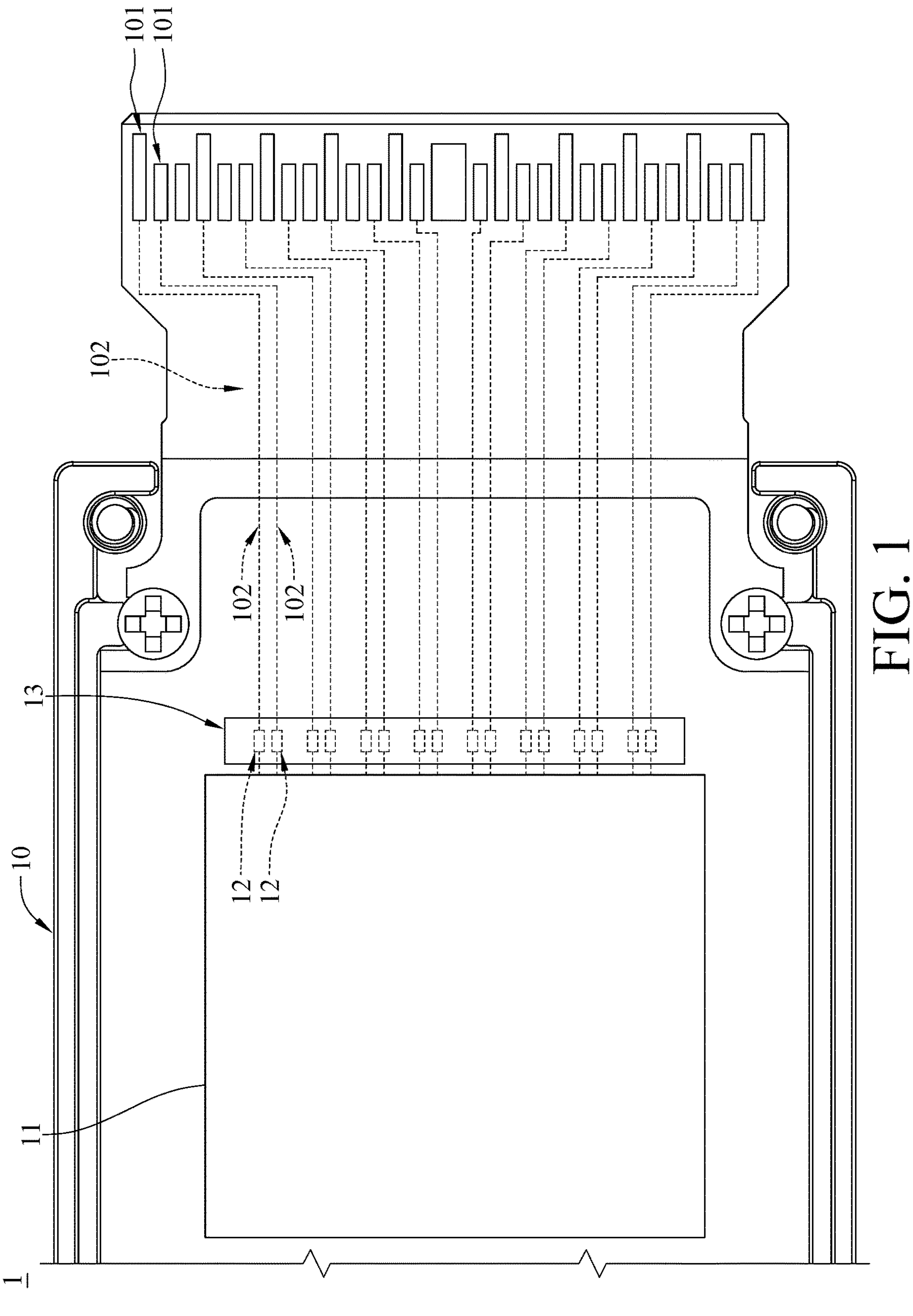
FIG. 1 is a schematic diagram illustrating an optical transceiver according to an embodiment of the present disclosure.

Please refer to FIG. 1, wherein FIG. 1 is a schematic diagram illustrating an optical transceiver according to an embodiment of the present disclosure. As shown in FIG. 1, the optical transceiver 1 may include a printed circuit board 10, a transceiver module 11, a plurality of filtering capacitors 12 and a noise absorber 13. The printed circuit board 10 may be provided with a plurality of gold fingers 101 and a plurality of signal lines 102. Each one of the gold fingers 101 is connected to one of the signal lines 102.

The transceiver module 11 may include an optical transmitter and an optical receiver. The transceiver module 11 and the filtering capacitors 12 may be disposed on the printed circuit board 10. The signal lines 102 may also be disposed within the printed circuit board 10. Each of the filtering capacitors 12 are located on one of the signal lines 102. For example, the filtering capacitors 12 may be AC-coupling capacitors or DC-decoupling capacitors. For example, the filtering capacitors 12 may be silicon capacitors and may be suitable for signal speed of the signal lines 102 ranging from 56 to 112 GBaud rates. The filtering capacitors 12 when placed on the signal lines 102 may have low broadband insertion loss, helping achieve energy consumption reduction. Further, the filtering capacitors 12 may be packaged in smaller cases to reduce the overall size of the optical transceiver 1 and even corresponding parasitic capacitance. Further, the filtering capacitors 12 may be of high capacitance.

Each of the signal lines 102 may connect one of the gold fingers 101 and the transceiver module 11. For example, the signal line 102 may connect the transceiver module 11 to a filtering capacitor 12 and further connect said filtering capacitor 12 to a corresponding gold finger 101.

It should be noted that in addition to the transceiver module 11 and the filtering capacitors 12, the optical transceiver 1 may include other electronic element(s) disposed on the printed circuit board 10. Further, FIG. 1 exemplarily shows the numbers and configurations of the filtering capacitors 12, the gold fingers 101 and the signal lines 102.

Figure 2:
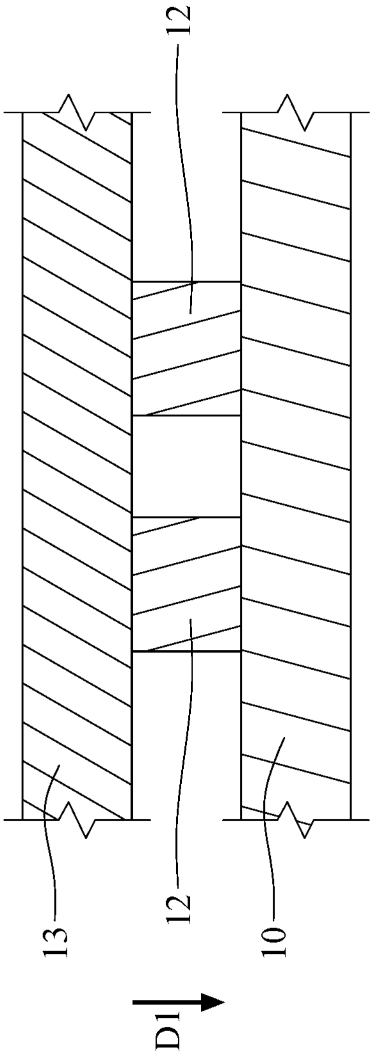
FIG. 2 is a cross sectional diagram showing the printed circuit board, the filtering capacitors and the noise absorber.

Please refer to FIG. 1 and FIG. 2, wherein FIG. 2 is a cross-sectional diagram showing the printed circuit board, the filtering capacitors and the noise absorber. As shown in FIG. 2, the noise absorber 13 covers at least one surface of the filtering capacitors 12 opposite to the printed circuit board 10. Take the two filtering capacitors 12 shown in FIG. 2 for example, the noise absorber 13 may cover one surface of each of the filtering capacitors 12. In other words, the noise absorber 13 may be in direct contact with said surfaces of the filtering capacitors 12. As shown in FIG. 2, the surfaces of the filtering capacitors 12 covered by the noise absorber 13 may be opposite to surfaces of the filtering capacitors 12 contacting the printed circuit board 10. In addition, the noise absorber 13 may cover more than one surface of the filtering capacitors 12. For example, the noise absorber 13 may cover all surfaces of the filtering capacitors 12 except the surfaces contacting the printed circuit board 10.

With the noise absorber 13, the electromagnetic interference (EMI) on the optical transceiver 1 may be reduced, thereby lowering the impact of electromagnetic interference on the operation of the optical transceiver.

As seen from FIG. 1 and FIG. 2, projection of an entirety of the filtering capacitors 12 along a disposition direction D1 on the printed circuit board 10 may be located within projection of the noise absorber 13 along the disposition direction D1 on the printed circuit board 10. That is, a range of the projection of the noise absorber 13 is preferably larger than a range of the projection of the filtering capacitors 12. The disposition direction D1 is the direction in which the filtering capacitors disposed on the printed circuit board 10, and particularly perpendicular to the top surface of the printed circuit board 10.

FIG. 1 illustrates the noise absorber 13 implemented in terms of one longitudinal stripe. In another implementation, however, the noise absorber 13 may include pieces of sub-absorbers, with each sub-absorber covering a surface of one of the filtering capacitors 12 opposite to the printed circuit board 10. Thus, the number of such sub-absorbers is equal to the number of the filtering capacitors 12.

Figure 3:
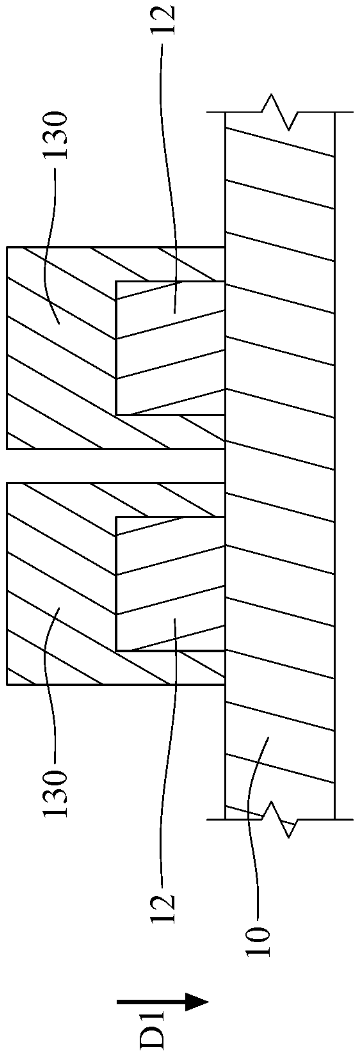
FIG. 3 is another cross sectional diagram showing the printed circuit board, the filtering capacitors and the noise absorber.

Please refer to FIG. 3, wherein FIG. 3 is another cross sectional diagram showing the printed circuit board, the filtering capacitors and the noise absorber. Alternatively, each sub-absorber 130 of the noise absorber 13 may further cover one or more side surfaces of each filtering capacitor 12. Extending direction of said side surfaces is substantially perpendicular to the top surface of the printed circuit board 10 and parallel to the disposition direction D1.

Materials of the noise absorber 13 may include nickel, silicone and iron, with the nickel being 37% to 42% in terms of percent by weight, the silicone being 15% to 25% in terms of percent by weight, and the iron being 38% to 43% in terms of percent by weight.

Please refer to table 1 below, which shows the testing result of EMI leakage on the optical transceiver of using general noise absorber (condition 1) and the optical transceiver using the noise absorber as described above (condition 2). Specifically, for condition 2, the optical transceiver has the structure as shown in FIG. 1 and FIG. 2, and the material of the noise absorber includes nickel, silicone and iron with percentages by weight as described above.

In table 1, the testing parameters of carrier frequency, field strength level, field strength limit and test distance are shown. The margin of the average type of condition 2 is higher than that of condition 1 by 4.46, which shows that condition 2 has improvement in reducing EMI.

TABLE 1

| Condition | Type | Freq. (GHz) | Level (dBuV/m) | Limit (dBuV/m) | Margin (dB) | Distance (m) |
|---|---|---|---|---|---|---|
| Condition 1 | Peak | 26.5625 | 65.33 | 89.54 | −24.21 | 1 |
| | Average | 26.5625 | 65.05 | 69.54 | −4.49 | 1 |
| Condition 2 | Peak | 26.5625 | 64.46 | 89.54 | −25.08 | 1 |
| | Average | 26.5625 | 60.59 | 69.54 | −8.95 | 1 |
| EMI improvement | | ΔAverage | | | 4.46 | — |

In addition, one of the filtering capacitors 12 may be in 01005 inch size (meaning 0.4 mm×0.2 mm×0.2 mm in size), and the rest of the filtering capacitors 12 may be in 0402 inch size (meaning 0.6 mm×0.3 mm×0.23 mm in size); or, each of the filtering capacitors 12 may be in 01005 inch size. Accordingly, by reducing the size of one or more of the filtering capacitors 12, energy of EMI radiation leakage may be reduced.

Please refer to table 2 below, which shows the testing result of EMI leakage on the optical transceiver of using the filter capacitors in 0402 inch size (condition 1) and the optical transceiver of using the filter capacitors in 01005 inch size (condition 2). Specifically, for condition 2, the optical transceiver has the structure as shown in FIG. 1 and FIG. 2, and the filtering capacitors are in 01005 inch size.

TABLE 2

| Condition | Type | Freq. (GHz) | Level (dBuV/m) | Limit (dBuV/m) | Margin (dB) | Distance (m) |
|---|---|---|---|---|---|---|
| Condition 1 | Peak | 26.5625 | 68.01 | 89.54 | −21.53 | 1 |
| | Average | 26.5625 | 67.01 | 69.54 | −2.53 | 1 |
| Condition 2 | Peak | 26.5625 | 65.33 | 89.54 | −24.21 | 1 |
| | Average | 26.5625 | 65.05 | 69.54 | −4.49 | 1 |
| EMI improvement | | ΔAverage | | | 1.96 | — |

In table 2, the testing parameters of carrier frequency, field strength level, field strength limit and test distance are shown. The margin of the average type of condition 2 is higher than that of condition 1 by 1.96, which shows that condition 2 has improvement in reducing EMI.

In view of the above description, electromagnetic interference (EMI) on the optical transceiver according to one or more embodiments of the present disclosure may be reduced, thereby lowering the impact of electromagnetic interference on the operation of the optical transceiver.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiver, comprising:

a printed circuit board provided with a plurality of signal lines and a plurality of gold fingers each connecting one of the plurality of signal lines;

a transceiver module disposed on the printed circuit board and connecting the plurality of signal lines;

a plurality of filtering capacitors each located on one of the plurality of signal lines; and a noise absorber covering at least one surface of the plurality of filtering capacitors opposite to the printed circuit board and without extending over a periphery of the transceiver module to overlap a portion thereof, wherein a material of the noise absorber comprises at least nickel.

2. The optical transceiver according to claim 1, wherein one of the plurality of filtering capacitors is in 01005 inch size.

3. The optical transceiver according to claim 1, wherein each of the plurality of filtering capacitors is in 01005 inch size.

4. The optical transceiver according to claim 1, wherein the material of the noise absorber further comprises silicone and iron.

5. The optical transceiver according to claim 4, wherein a percent by weight of the nickel is 37% to 42%, a percent by weight of the silicone is 15% to 25%, and a percent by weight of the iron is 38% to 43%.

6. The optical transceiver according to claim 1, wherein a projection of an entirety of the plurality of filtering capacitors on the printed circuit board is within a projection of the noise absorber on the printed circuit board.

7. The optical transceiver according to claim 1, wherein the plurality of filtering capacitors and the noise absorber are disposed between the transceiver module and the plurality of gold fingers in a longitudinal direction of the printed circuit board, and the plurality of filtering capacitors are closer to the transceiver module than the plurality of gold fingers in the longitude direction of the same.

8. The optical transceiver according to claim 7, wherein the plurality of filtering capacitors are disposed on the printed circuit board in a disposition direction, a minimum distance in the disposition direction between the noise absorber and the at least one surface of the plurality of filtering capacitors is less than a thickness of each of the plurality of filtering capacitors.

9. The optical transceiver according to claim 1, wherein the noise absorber comprises a plurality of sub-absorbers each covering a side surface of one of the plurality of filtering capacitors.

* * * * *